United States Patent
Andersen et al.

(10) Patent No.: US 12,203,445 B2
(45) Date of Patent: Jan. 21, 2025

(54) METHOD OF OPERATING A WIND TURBINE IN AN ACTIVE IDLE MODE WITH FAULTY BLADES

(71) Applicant: Siemens Gamesa Renewable Energy A/S, Brande (DK)

(72) Inventors: Martin Folmer Andersen, Copenhagen (DK); Gustav Hoegh, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/291,353

(22) PCT Filed: Jul. 21, 2022

(86) PCT No.: PCT/EP2022/070457
§ 371 (c)(1),
(2) Date: Jan. 23, 2024

(87) PCT Pub. No.: WO2023/011931
PCT Pub. Date: Feb. 9, 2023

(65) Prior Publication Data
US 2024/0209839 A1    Jun. 27, 2024

(30) Foreign Application Priority Data
Aug. 2, 2021 (EP) .................................. 21189101

(51) Int. Cl.
*F03D 17/00* (2016.01)
*F03D 7/02* (2006.01)

(52) U.S. Cl.
CPC ............. *F03D 17/029* (2023.08); *F03D 7/02* (2013.01); *F03D 17/014* (2023.08); *F05B 2260/80* (2013.01)

(58) Field of Classification Search
CPC ...... F03D 17/00; F03D 17/013; F03D 17/014; F03D 17/028; F03D 17/029; F03D 7/02; F03D 7/022; F03D 7/0224; F03D 7/024; F03D 7/0264; F05B 2260/80
See application file for complete search history.

(56) References Cited

U.S. PATENT DOCUMENTS

| | | | |
|---|---|---|---|
| 7,944,067 B2 * | 5/2011 | Kammer | F03D 7/0224 290/44 |
| 2015/0361964 A1 * | 12/2015 | Daher Adegas | F03D 7/0224 416/61 |
| 2016/0377057 A1 | 12/2016 | Caponetti et al. | |
| 2018/0347542 A1 * | 12/2018 | Tomas | F03D 80/80 |

FOREIGN PATENT DOCUMENTS

EP    3 076 011 A1    10/2016

OTHER PUBLICATIONS

International Search Report and Written Opinion for PCT/EP2022/070457, mailed on Oct. 7, 2022.

* cited by examiner

*Primary Examiner* — Elton K Wong
(74) *Attorney, Agent, or Firm* — Schmeiser, Olsen & Watts LLP

(57) ABSTRACT

A method of operating a wind turbine in an active idle mode is provided, the wind turbine including a rotor hub with a plurality of blades which are configured to be pitched. The method including the following steps: detecting a fault of the wind turbine; determining a number of faulty blades, whose pitching operation is faulty or affected by a fault; and operating the wind turbine in the active idle mode based on the determined number of faulty blades.

12 Claims, 2 Drawing Sheets

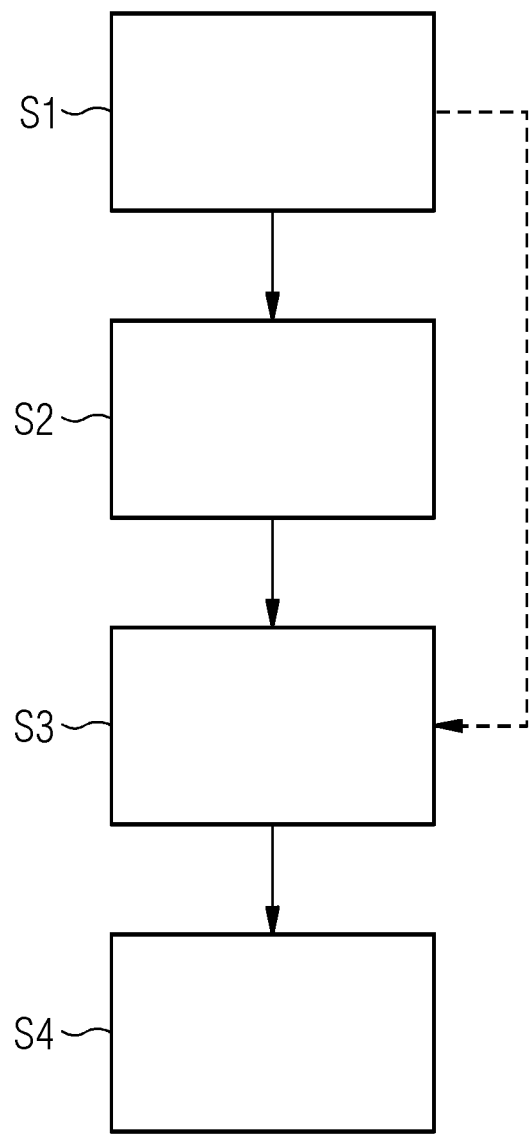

METHOD OF OPERATING A WIND TURBINE IN AN ACTIVE IDLE MODE WITH FAULTY BLADES

CROSS-REFERENCE TO RELATED APPLICATIONS

This application claims priority to PCT Application No. PCT/EP2022/070457, having a filing date of Jul. 21, 2022, which claims priority to European Application No. 21189101.5, having a filing date of Aug. 2, 2021, the entire contents both of which are hereby incorporated by reference.

FIELD OF TECHNOLOGY

The following relates to a method of operating a wind turbine in an active idle mode with faulty blades, whose pitching operation is faulty or affected by a fault.

BACKGROUND

Active idling is currently to be utilized for wind turbines designed with a single fluid film bearing. The reason is that this bearing type requires lubrication and should therefore not rotate in some speed regions, especially at very low speeds. Active idling can be used to control a speed range in which the idling takes place by pitching the blades. However, during faulty scenarios, especially during faults on the pitch system, the active idling is conventionally not allowed, as the blades are not able to pitch. Wind turbines with traditional ball bearings also rely on active idling to ensure rotation and thereby to avoid stand still marks.

Faults on the pitch system have so far resulted in a stop type, where the wind turbine will perform free idling, or the rotor brake is set. Free idling means that the blades are pitched to a stop-position (a feather position), and the rotor can rotate freely in either direction or stand still without any control of the speed, where the rotor speed solely depends on the aerodynamic forces acting on the rotor.

SUMMARY

An aspect relates to a method of operating a wind turbine in an active idle mode, which protects the bearings even in case of faulty blades.

According to an aspect of embodiments of the invention, a method of operating a wind turbine in an active idle mode is provided. The wind turbine comprises a rotor hub with a plurality of blades which are configured to be pitched. Pitching means a rotation around a longitudinal axis of the respective blade. In embodiments, the method comprises the following steps: detecting a fault of the wind turbine; determining a number of faulty blades, whose pitching operation is faulty or affected by the fault; and operating the wind turbine in the active idle mode based on the determined number of faulty blades.

In an embodiment, the wind turbine is operated in the active idle mode if at least one blade is not faulty. In an embodiment, the active idle mode is operated by the at least one blade which is not faulty.

In an embodiment, a rotational speed or speed range in the active idle mode is determined based on the determined number of faulty blades. In an embodiment, a rotational speed or speed range in the active idle mode is determined to be lower, the higher the number of faulty blades is. For example, an allowed speed range in the active idle mode can be modified for dealing with the fault on one or more blades.

For example, with all working blades, the speed range may be 2-8 rpm where the allowed range may be reduced to 2-3 rpm if operating with faults.

In an embodiment, a threshold of an existing turbine monitoring algorithm is modified during the active idle mode based on the determined number of faulty blades. For example, the threshold of the existing turbine monitoring algorithm can be a lower limit tower acceleration monitor, an increased threshold for allowed $1p$ content in the rotational speed, a reduced wind limit (which leads to a stop of the wind turbine at high wind speeds).

In an embodiment, the faulty blade/blades is/are pitched to a feathering or stop angle, to a maximum pitch angle in the active idle mode, for example if the blade/blades is/are completely inoperable.

In another embodiment, a faulty blade is pitched to a constant angle smaller than the feathering or stop angle but higher than an angle of a non-faulty blade during the active idle mode, for example if the faulty blade is operable to some degree. This may reduce imbalances as the pitch angle differences between the blades are reduced and thereby structurally loads on the turbine are reduced.

In an embodiment, a faulty blade is pitched with a first pitch speed and a non-faulty blade is pitched with a second pitch speed, the first pitch speed being lower than the second pitch speed. In an embodiment, a faulty blade is pitched with a pitch reference which has an offset compared to a pitch reference of a non-faulty blade. In this case, the pitch reference to the faulty blade may have the offset added compared to the non-faulty blades, i.e., the faulty blade can be pitched further towards the feather position than the non-faulty blade. Thereby, the imbalance is further reduced, while the risk of operating the faulty blade too close to a fine position (i.e., a pitch angle of nearly zero degree) due to a slow pitch speed is reduced.

In an embodiment, during the step of determining the number of faulty blades, all blades are pitched to the feathering or stop angle, and after having determined the number of faulty blades, the wind turbine is operated in the active idle mode.

Embodiments of the present invention offer a new idling strategy which allows to perform the active idling mode even with faults on the pitch system in one or more blades. In modern wind turbines, the pitch system for all blades is often at least partly redundant so that the most likely faults will only impact the ability to pitch one blade. Examples of such failures could be a faulty proportional valve controlling the speed of each blade, ruptured or leaking hoses, leaking or broken pitch cylinders, faulty measurements of the pitch angle, broken accumulators, and/or valves. Some of these faults may just reduce the performance of the affected blade. This could for example be a broken accumulator, where it may be possible to pitch the blade only at reduced pitch speed.

After detection of a fault in the conventional art, all blades are conventionally pitched to the stop position either by the controller system or the safety system. Modern turbines are able to stop the turbine by pitching the blades to stop even with a fault in the pitch system. Embodiments of the present invention, however, utilize the blades with an operational pitch system to actively control the rotor speed range and thereby avoid the low rotor speeds so that damages of the bearings, such as a single fluid film bearing, is avoided. For turbines with conventional ball bearings, a stand still damage can be avoided. In addition, the operation of the active idle mode even in case of faulty blades ensures that an electric accumulator is properly charged for a self-sustaining wind turbine operation.

The rotor speed is controlled in the active idling mode even in case of a fault in one or more blades, instead of not controlling the rotor speed at all (free idling). A cost-advantage is that the main bearing will keep its lubrication state and therefore has a longer lifetime. Maintenance cost and/or risk of complete failure can be reduced. Similarly, a risk of standstill marks on existing turbines with ball bearing is reduced by ensuring rotation.

The active idle mode can also implement a so-called Self-Sustained-Turbine-(SST-) mode, where a battery pack can be charged if the rotor speed is above some low threshold.

It has to be noted that embodiments of the invention have been described with reference to different subject matters. In particular, some embodiments have been described with reference to apparatus type claims whereas other embodiments have been described with reference to method type claims. However, a person skilled in the conventional art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION

Some of the embodiments will be described in detail, with references to the following Figures, wherein like designations denote like members, wherein:

FIG. 2 shows a flow chart of a method of operating a wind turbine in an active idle mode according to an embodiment.

DETAILED DESCRIPTION

Figure 1:
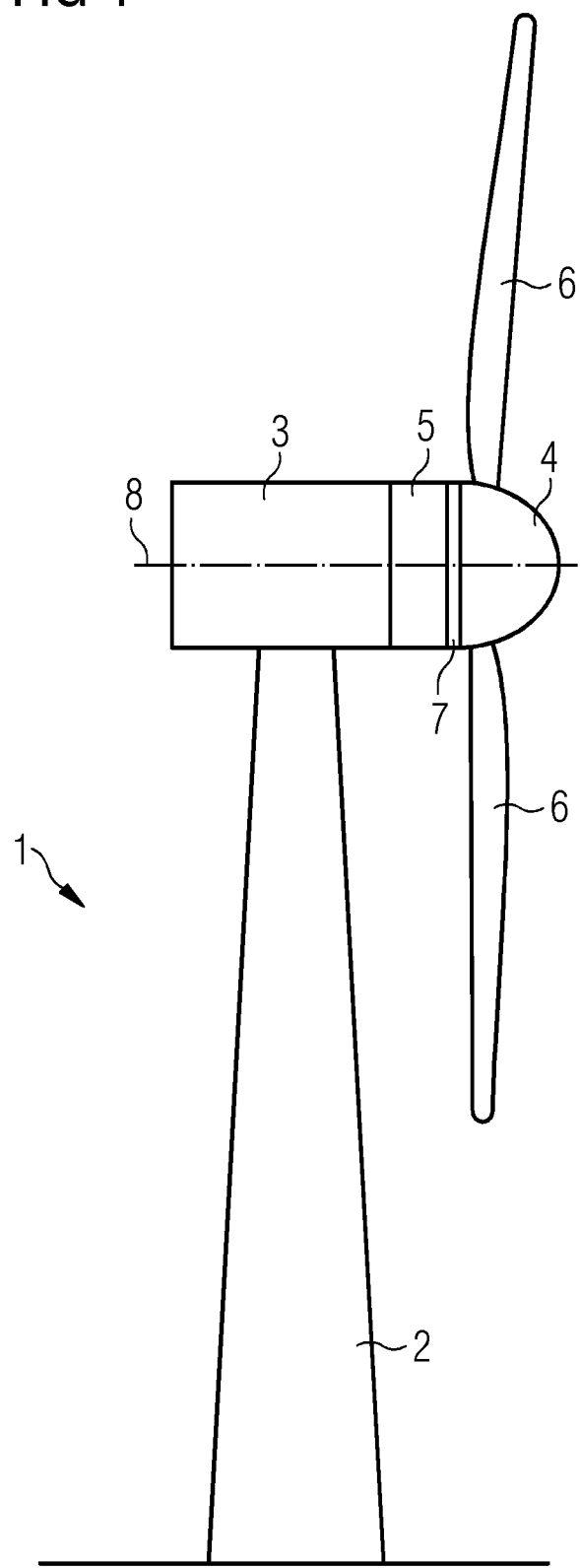
FIG. 1 shows a wind turbine and the different elements thereof.

FIG. 1 shows a wind turbine 1. The wind turbine 1 comprises a nacelle 3 and a tower 2. The nacelle 3 is mounted at the top of the tower 2. The nacelle 3 is mounted rotatable with regard to the tower 2 by a yaw bearing. The axis of rotation of the nacelle 3 with regard to the tower 2 is referred to as the yaw axis.

The wind turbine 1 also comprises a hub 4 with three rotor blades 6 (of which two rotor blades 6 are depicted in FIG. 1). The hub 4 is mounted rotatable with regard to the nacelle 3 by a main bearing 7. The hub 4 is mounted rotatable about a rotor axis of rotation 8.

The wind turbine 1 furthermore comprises a generator 5. The generator 5 in turn comprises a rotor connecting the generator 5 with the hub 4. If the hub 4 is connected directly to the generator 5, the wind turbine 1 is referred to as a gearless, direct-driven wind turbine. Such a generator 5 is referred as direct drive generator 5. As an alternative, the hub 4 may also be connected to the generator 5 via a gear box. This type of wind turbine 1 is referred to as a geared wind turbine. Embodiments of the present invention are suitable for both types of wind turbines 1.

The generator 5 is accommodated within the nacelle 3. The generator 5 is arranged and prepared for converting the rotational energy from the hub 4 into electrical energy in the shape of an AC power.

Each blade 6 can be pitched, i.e., rotated about its respective longitudinal axis so as to control an operation of the wind turbine 1. During an active idle mode, a number of faulty blades 6 is determined, whose pitching operation is faulty or affected by a fault, after having detected the fault. The wind turbine 1 of embodiments of the present invention is operated in the active idle mode based on the number of faulty blades 6. For example, the active idle mode can be operated by the at least one blade 6 which is not faulty. Contrary to a conventional active idle mode, the wind turbine 1 of embodiments of the present invention is operated in the active idle mode even if one or more blades 6 is/are faulty.

FIG. 2 shows a flow chart of a method of operating a wind turbine 1 in an active idle mode according to an embodiment. If the fault is detected, all blades 6 are pitched to a feathering or stop angle during the step of determining the number of faulty blades 6. After having determined the number of faulty blades 6, the wind turbine 1 is operated in the active idle mode. In embodiments, the method comprises a step S1, where the presence of the fault is detected. In a step S2, all blades 6 are pitched to the feathering or stop angle. In a step S3, the number of faulty blades 6 is determined, or the number of blades 6 is determined, which are affected by the fault which is detected in step S1. In a step S4, the active idle mode is initiated. For example, if a sufficient number of non-faulty blades 6 is present, the active idle mode can be carried out by these non-faulty blades 6. However, it is also conceivable to operate the wind turbine 1 in the active idle mode if all blades 6 are faulty.

As a matter of course, the step S2 can be omitted as shown by a dashed line in FIG. 2. That means, upon the fault detection in step S1, the active idle mode of step S3 is directly initiated, if the number of faulty blades 6 can be determined before all blades 6 are pitched to the feathering or stop angle. The efficiency of the operation is thus enhanced.

In the step S3, a rotational speed or speed range in the active idle mode can be determined based on the determined number of faulty blades 6. In an embodiment, a rotational speed or speed range in the active idle mode is determined to be lower, the higher the number of faulty blades 6 is. For example, an allowed speed range in the active idle mode can be modified for handling the fault on one or more blades 6. For example, with all working blades 6, the speed range may be 2-8 rpm, where the allowed range may be reduced to 2-3 rpm if operating with faults.

A threshold of an existing turbine monitoring algorithm can be modified during the active idle mode based on the determined number of faulty blades 6. For example, the threshold of an existing turbine monitoring algorithm can be a lower limit tower acceleration monitor, an increased threshold for allowed 1p content in the rotational speed, a reduced wind limit (which leads to a stop of the wind turbine 1 at high wind speed).

During the active idle mode, if a faulty blade is completely inoperable, the faulty blade/blades 6 is/are pitched to a feathering or stop angle, to a maximum pitch angle. Otherwise, if a faulty blade 6 is operable to some degree, such faulty blade 6 can be pitched to a constant angle smaller than a feathering or stop angle but higher than an angle of a non-faulty blade 6 during the active idle mode. This may reduce imbalances as the pitch angle differences between the blades 6 are reduced and thereby structurally loads on the turbine 1 are reduced.

In an embodiment, a faulty blade 6 can be pitched with a first pitch speed and a non-faulty blade 6 can be pitched with a second pitch speed, the first pitch speed being lower than the second pitch speed.

In another embodiment, a faulty blade 6 can be pitched with a pitch reference which has an offset compared to a pitch reference of a non-faulty blade 6. Thereby, the imbalances are further reduced, while the risk of operating the faulty blade 6 too close to fine due to a slow pitch speed is reduced.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating a wind turbine in an active idle mode, the wind turbine comprising a rotor hub with a plurality of blades which are configured to be pitched, the method comprising:
   detecting a fault of the wind turbine;
   determining a number of faulty blades, whose pitching operation is faulty or affected by the fault; and
   operating the wind turbine in the active idle mode based on the number of faulty blades.

2. The method according to claim 1, wherein
   the wind turbine is operated in the active idle mode if at least one blade is not faulty.

3. The method according to claim 2, wherein
   the active idle mode is operated by the at least one blade which is not faulty.

4. The method according to claim 1, wherein a rotational speed or a speed range in the active idle mode is determined based on the number of faulty blades.

5. The method according to claim 4, wherein the rotational speed or the speed range in the active idle mode is determined to be lower, the higher the number of faulty blades is.

6. The method according to claim 1, wherein a threshold of an existing turbine monitoring algorithm is modified during the active idle mode based on the number of faulty blades.

7. The method according to claim 1, wherein the faulty blade/blades is/are pitched to a feathering or stop angle in the active idle mode.

8. The method according to claim 7, wherein the feathering or stop angle is a maximum pitch angle.

9. The method according to claim 1, wherein a faulty blade is pitched to a constant angle smaller than a feathering or stop angle but higher than an angle of a non-faulty blade during the active idle mode.

10. The method according to claim 1, wherein a faulty blade is pitched with a first pitch speed and a non-faulty blade is pitched with a second pitch speed, the first pitch speed being lower than the second pitch speed.

11. The method according to claim 1, wherein a faulty blade is pitched with a pitch reference which has an offset compared to a pitch reference of a non-faulty blade.

12. The method according to claim 1, wherein if the fault is detected, all blades are pitched towards a feathering or stop angle and the number of faulty blades is determined; and
   after having determined the number of faulty blades, the wind turbine is operated in the active idle mode.

* * * * *